United States Patent

Miller

[15] 3,636,803

[45] Jan. 25, 1972

[54] PIPE-BEVELLING TOOL

[72] Inventor: Cornelius C. Miller, 10135 S. W. Inez St., Tigard, Oreg. 97223

[22] Filed: Nov. 14, 1969

[21] Appl. No.: 876,904

[52] U.S. Cl. ..................................................82/4 C, 144/205
[51] Int. Cl...........................................................B23b 5/16
[58] Field of Search ............................30/94, 173, 300, 310; 15/104.03, 104.04; 82/4 R, 4 C; 10/110, 113; 144/205

[56] References Cited

UNITED STATES PATENTS

| 2,616,462 | 11/1952 | Haddican | 144/205 |
| 2,868,085 | 1/1959 | Klein | 82/4 R X |
| 3,303,732 | 2/1967 | Gill | 144/205 X |
| 3,361,017 | 1/1968 | Baumgarten | 144/205 X |

FOREIGN PATENTS OR APPLICATIONS

| 858,702 | 1/1961 | Great Britain | 82/4 R |

Primary Examiner—Andrew R. Juhasz
Assistant Examiner—Michael Koczo, Jr.
Attorney—Clarence A. O'Brien and Harvey B. Jacobson

[57] ABSTRACT

A manually operated unitary tool having a mandrel which is slidably inserted in a pipe end. The mandrel rotatably mounts a toolholder to which is connected a first blade causing bevelling of the pipe end as the toolholder is rotated. A second blade is mounted to the toolholder and squares the pipe end edge as the toolholder is rotated. The end result after utilizing the present tool is a finished bevelled pipe end which is easily inserted into a mating pipe end or fitting to form a joint.

4 Claims, 8 Drawing Figures

Cornelius C. Miller
INVENTOR.

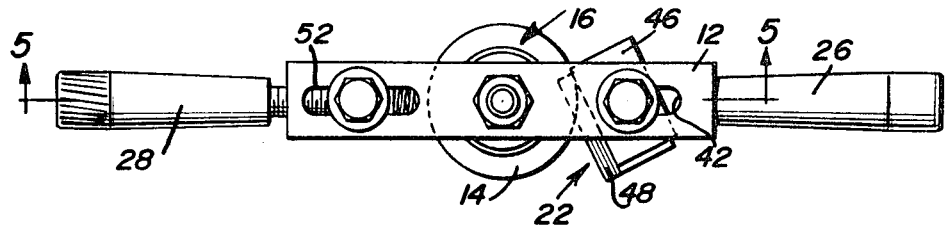
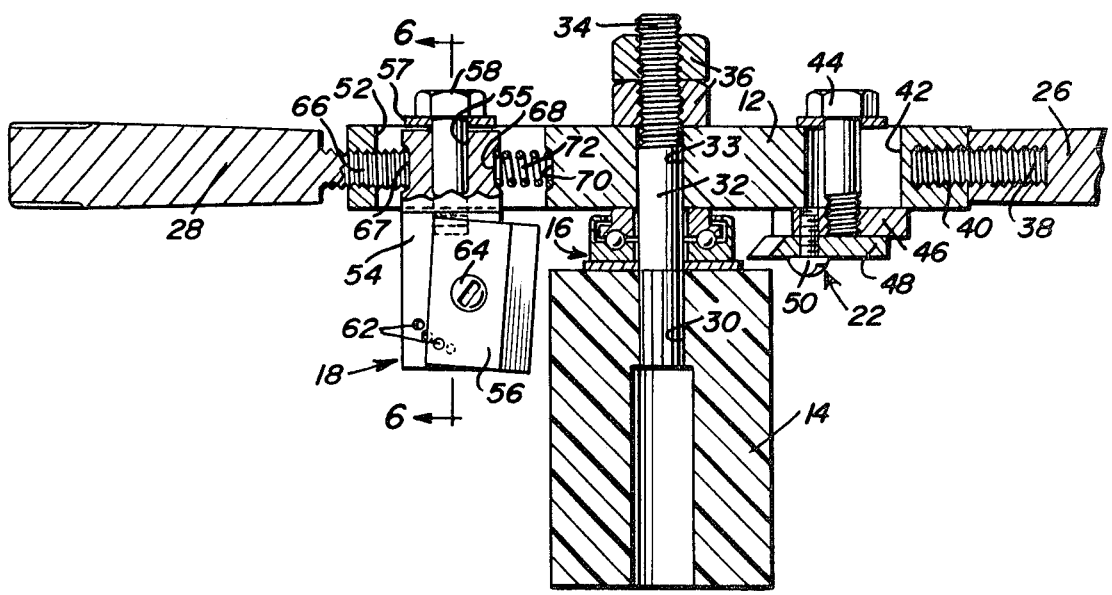

PIPE-BEVELLING TOOL

The present invention relates to a manually operated tool for forming a finished bevelled end on a pipe end.

With the increasing use of plastic pipe in conduit system construction, there is a definite need for bevelling and squaring pipe ends which form joints of mating pipe sections. Prior art tools include means for bevelling a pipe end but a second separate tool is required for squaring or finishing the end edge of the bevel so that a superior tight fit can be achieved. As will be appreciated, the use of separate tools necessitating at least two separate operations is time consuming and results in an unnecessary financial expenditure.

The primary objective of the present invention is to provide field and shop workers with a single tool that will bevel and square a plastic pipe end. By forming a proper bevel, interlocking pipe sections may be fitted with ease, and the formation of a square end on the bevel insures a tighter joint.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 4 is a top plan view of the tool.

FIG. 5 is a vertical sectional view taken along a plane passing through section line 5—5 of FIG. 4.

FIG. 6 is a transverse sectional view taken along a plane passing through section line 6—6 of FIG. 5.

FIG. 7 is a sectional view taken along a plane passing through section line 7—line of FIG. 2.

FIG. 8 is a perspective view illustrating the blade used in forming the pipe bevel.

Figure 1:
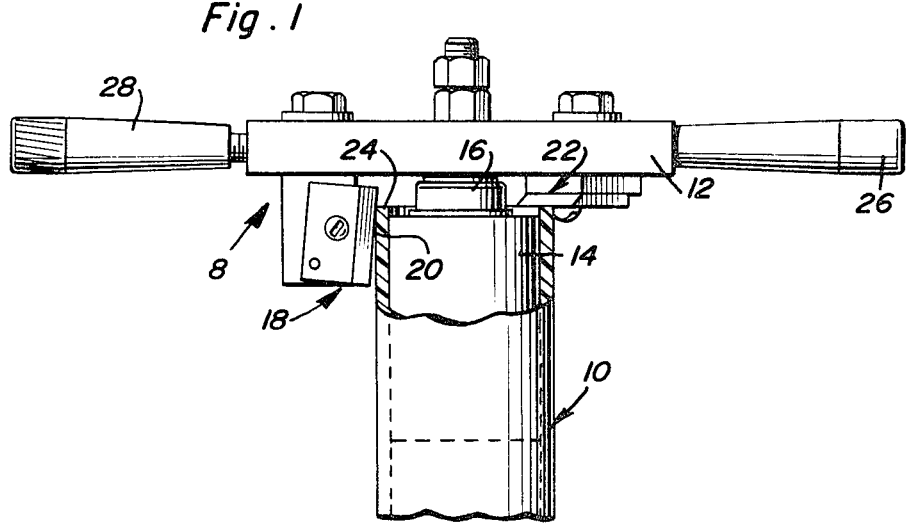
FIG. 1 is a side elevational view illustrating the present bevelling tool.

Referring to the drawings and more particularly FIG. 1, the present bevelling tool is generally denoted by reference numeral 8 and is seen to include a horizontally oriented barlike toolholder having cutting elements which operate upon an engaged end portion of a pipe 10. In the preferred utilization of the present invention, the pipe is fabricated from a suitable elastomeric material and more particularly from conventionally used plastic pipe.

The toolholder 12 rotatably mounts a perpendicularly disposed mandrel 14 adapted to be inserted within the pipe end. The mandrel is dimensionally designed to effect a snug fit with the engaging pipe end. A ball bearing 16 rotatably connects the toolholder 12 to the mandrel 14 at a point in spaced coaxial relation with the pipe end. Connection of the ball bearing to the work holder 12 is achieved at a median point on the work holder. Thus far described, the work holder rotates in spaced coaxial relation to the end of the pipe.

Figure 2:
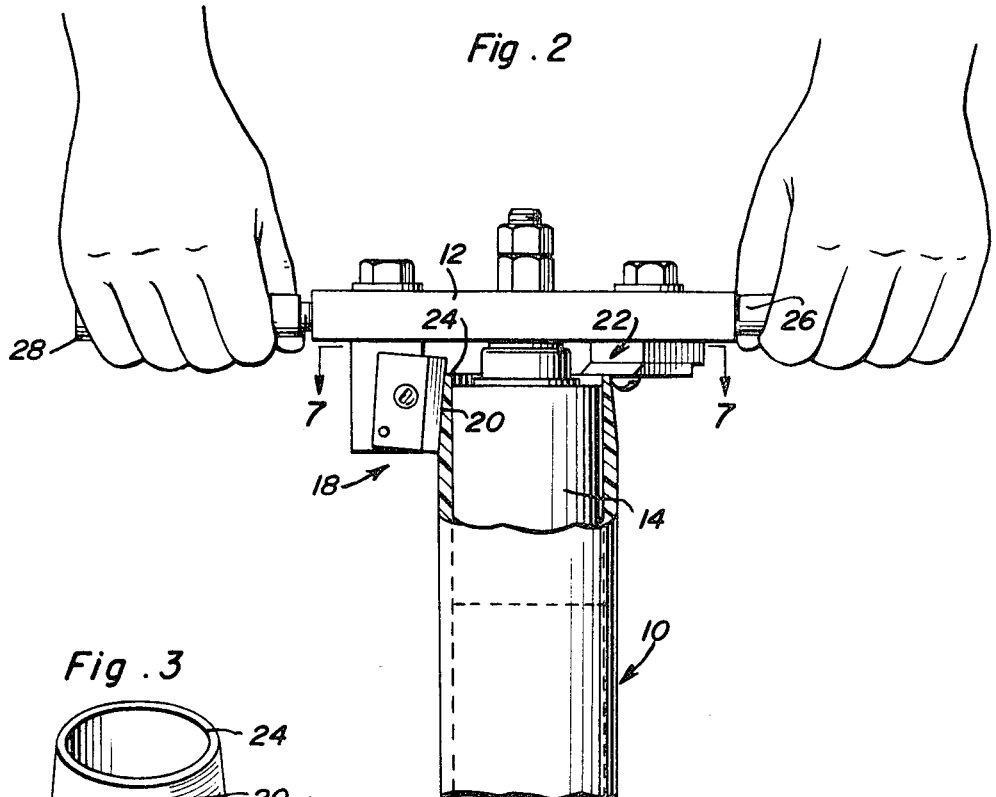
FIG. 2 shows the tool in a pipe-engaging position and grasped by a user's hands.
Figure 3:
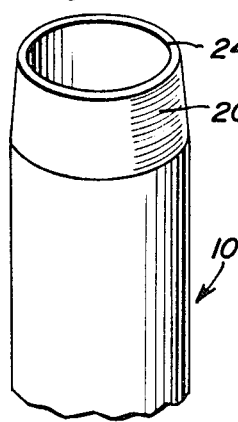
FIG. 3 is a partial perspective view of a pipe section illustrating a finally formed bevelled end.

One side of the toolholder 12 connects a bevel cutter generally indicated by 18 which contacts the peripheral end portion of the pipe and forms a bevel as the work holder 12 is rotated. The area of contact between the bevel cutter and the pipe end is indicated by reference numeral 20. A second cutter 22 is mounted on the other side of the work holder and normally engages the outer end edge 24 of the pipe. The second cutter 22 finishes or squares the outer end edge as the toolholder 12 is rotated. Thus, in effect, as the toolholder 12 is rotated relative to the pipe, both a bevel and a squared end edge are formed simultaneously. In order to assist the manual operation of the tool, handles 26 and 28 are mounted in outward extension from the ends of the toolholder 12. These handles permit grasping thereof by the worker's hands as seen in FIG. 2. The end result, namely the squared bevelled end portion of the pipe formed after rotation of the toolholder, is illustrated in FIG. 3. The formation of this finished bevel facilitates the insertion of the pipe end into a mating pipe section. The particular purpose of squaring the outer end edge is to form a smooth end enabling a tighter fit with a mating pipe.

Considering the structure of the tool itself, reference is made to FIG. 5 wherein the mandrel 14 is shown to include an axially extending bore 30 receiving an outwardly extending shaft 32 which first passes through bearing 16 then aperture 33 in the toolholder 12, and finally terminates outwardly therefrom in a threaded portion 34. Fastening nuts 36 threadingly engage the outward portion of shaft 32 thereby locking the toolholder 12 against bearing 16. A threaded stud 38 is seated within a mating aperture 40 formed in the right transverse end of the toolholder 12. The stud extends outwardly to mount the aforementioned handle 26.

An elongated oblong aperture 42 is formed in the right end portion of work holder 12 for receiving a capped bolt 44 therethrough. A nut member 46 engages the outwardly extending end portion of the bolt at the lower end thereof and secures it into position at a preselected point in slot 42. The nut member 46 serves as a mounting block for a finishing blade 48, and the connection therebetween is effected by a suitable fastener 50 passing through the blade 48 and fittingly received in the nut member 46. The blade 48 is disposed in spaced perpendicular relation to the central shaft 32 and as will be seen in FIG. 7, the blade is positioned so that the central portion thereof overlaps the upper and outer end edge of pipe 10.

A second oblong aperture or slot 52 is formed on the left side of the workpiece 12 and slidably receives a vertically disposed mounting block 54 which mounts the bevel cutting means 18. The upper end portion of the mounting block 54 includes an aperture 56 therein for receiving a capping bolt 58, similar to the bolt 44 aforementioned. Particularly, the bolt includes an annular shoulder flange 57, or instead of the flange, the bolt may be seated upon a washer serving to position the mounting block 54 in the slot 52.

The cutting means 18 more particularly includes a vertically disposed and inclined blade 56 mounted into contacting juxtaposition with a confronting surface of the mounting block 54 as clearly shown in FIG. 6. By virtue of the blade inclination, a bevel is formed in the pipe as the blade is driven in contacting rotation against the pipe end. Viewing FIG. 8, the blade 56 includes a dole pin 60 and apertures 62 formed along a circular arc are formed in the confronting surface of mounting block 54 so that the angular inclination of the blade with respect to the pipe may be varied and fixed into place when the dole pin engages a selected aperture 62. The engagement between the dole pin and the aperture is retained by seating the blade 56 against mounting block 54 with a suitable threaded fastener 64.

As clearly shown in FIG. 5, the upper portion of mounting block 54 includes an annular notch 67 therein for receiving a threaded stud extension 66 forming an integral part with the left handle 28. By tightening handle 28, the studded portion 66 bears against the mounting block 54 and in turn causes displacement of blade 56 toward mandrel 14. When the tool is inserted in a pipe end, this displacement results in greater bearing relation of the blade 56 against the pipe. Thus, handle 28 serves as a means for adjusting the position of the blade relative to the pipe.

A second notch 68 is formed in diametrical opposition to the aforementioned notch 67 and serves to receive one end of a coil spring 72. The opposite end of the coil spring is received within an annular notch 70 formed in the confronting surface of elongated slot 52. In operation, spring 72 biases the mounting block 54 against threaded stud 66 and as handle 28 is loosened, the spring causes the mounting block and the attached blade to be moved outwardly along the length of the toolholder 12.

Although the present invention has been described in terms of its use with elastomeric, preferably plastic pipe, the tool may be utilized with metal pipes by simply substituting suitable metalworking members such as abrasive pads instead of the blades.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tool for forming a finished peripheral bevel on an end portion of a tubular member, the tool comprising a generally cylindrical mandrel adapted for fixed insertion in the end of the tubular member, a toolholder rotatably connected to the mandrel, the toolholder having outer ends defining handles extending in spaced radial relation to the mandrel for allowing rotational manipulation of the holder, a bevelling blade mounted to the holder and oriented for engaging the end portion of the tubular member and causing the bevelling thereof during rotation of the toolholder, a first radially extending slot formed in the toolholder, a first mounting block mounting and positioning the bevelling blade, the first block being adjustably positioned in the first slot, one of the handle extensions of the toolholder having a threaded portion seated in the holder and extending radially inward into the first slot with its end engaging the first block whereby threaded adjustment of the handle results in displacement of the first block relative to the slot, and biasing means extending into the first slot and engaging the first block to press it against the end of the threaded portion.

2. The structure set forth in claim 1 together with finishing means including a finishing blade having a cutting edge disposed in a plane perpendicular to the axis of rotation of the toolholder to form an end edge on the tubular member perpendicular to the longitudinal axis thereof.

3. The structure set forth in claim 2 wherein the toolholder includes a second radially extending slot, a second mounting block underlying the second slot and supporting the finishing blade, and bolt means extending through the second slot and threadedly received by the second mounting block for selectively radially positioning the finishing blade relative to the mandrel.

4. The structure set forth in claim 1 wherein the first mounting block includes a bevel blade mounting hole and a plurality of arcuately spaced apertures lying along a circle about the mounting hole, the bevel blade including an opening aligned with the mounting hole and a positioning pin selectively engaged with one of the apertures to position the bevel blade to the desired cutting angle, and fastening means extending through the bevel blade opening into the mounting hole for securing the bevel blade in position.

* * * * *